Oct. 8, 1963  G. P. HANLEY ETAL  3,106,097
VARIABLE SPEED GOVERNOR

Filed Jan. 19, 1961  3 Sheets-Sheet 3

INVENTORS
George P. Hanley
BY & Charles E. Sloan

ATTORNEY

3,106,097
VARIABLE SPEED GOVERNOR
George P. Hanley, Northville, and Charles E. Sloan, Detroit, Mich., assignors to General Motors Corporation, Detroit, Mich., a corporation of Delaware
Filed Jan. 19, 1961, Ser. No. 83,651
3 Claims. (Cl. 73—541)

This invention relates to a centrifugal governor for an internal combustion engine and more particularly to a variable-speed centrifugal governor adapted to regulate the fuel supply of an associated internal combustion engine to maintain engine speed in accordance with operator adjustment of a governor speed control element.

The invention contemplates an improved governor of the type described which is of relatively simple and inexpensive construction; permits maximum versatility in meeting the mounting and speed and load requirements of different engine installations; provides an improved integral booster spring arrangement compensating for increased speeder spring bias to minimize operator effort in effecting speed setting adjustment of the governor; and provides an improved fuel controlling linkage permitting actuation thereof independently of the opposed biasing forces of the speeder spring control and of the centrifugal speed indicative mechanism.

The foregoing and other objects, advantages and features of the invention will be more thoroughly understood from the following description of a preferred illustrative embodiment, having reference to the accompanying drawings, in which.

Figure 1:
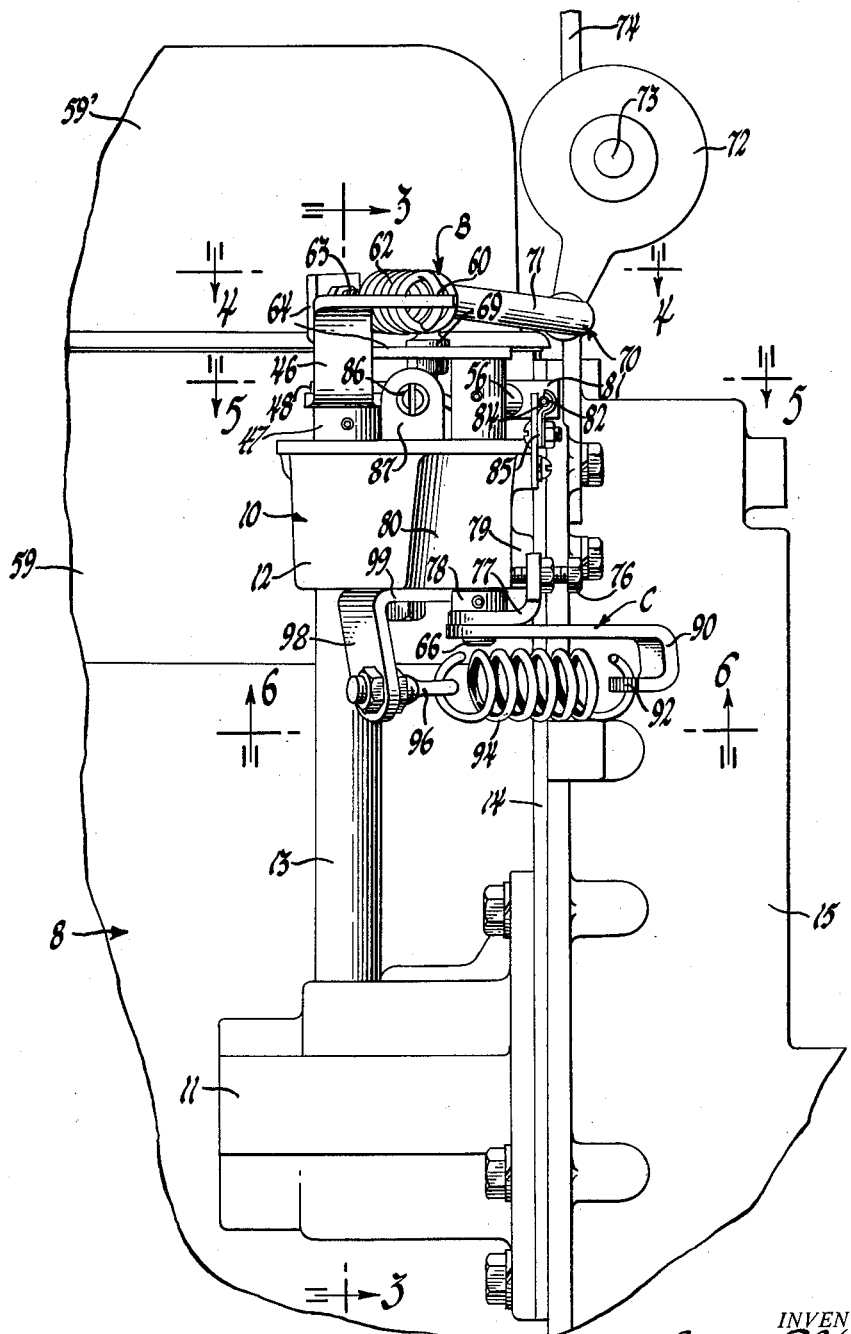
FIGURE 1 is a side elevational view of a portion of an internal combustion engine showing the operational environment and mounting of the governor embodying the invention.
Figure 6:
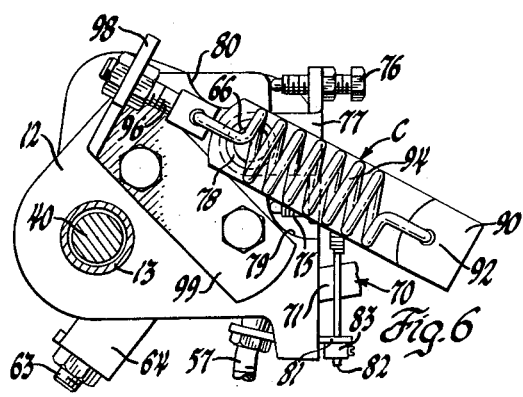
Figure 4:
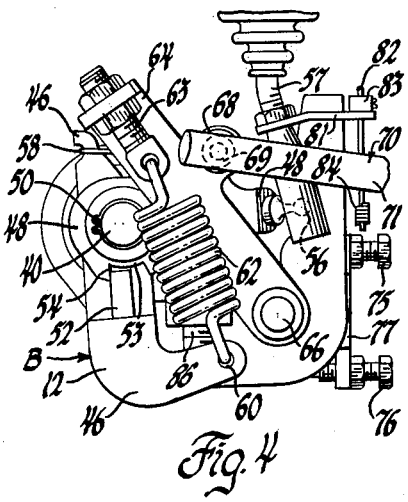
FIGURE 4 is a top elevational view of the governor speeder spring and fuel control linkages and is taken in the plane of the line and in the direction of the arrows indicated at 4—4 in FIGURE 1.
Figure 5:
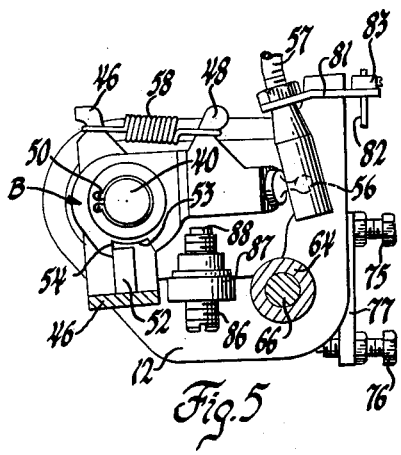

FIGURE 5 is a view similar to FIGURE 4 with portions thereof broken away and in section to show certain additional details of the control linkages and is taken substantially in the plane of the line and in the direction of the arrows indicated at 5—5 in FIGURE 1; and FIGURE 6 is a bottom elevational view of the governor controls and is taken substantially in the plane of the line and in the direction of the arrows indicated at 6—6 in FIGURE 1.

Referring more particularly to the drawings, a governor incorporating the invention is indicated at 10 and includes a housing comprising a bell-shaped base member 11 and a control head 12 interconnected by a housing sleeve 13. The housing base and head are secured to the front face of an end plate 14 and timing gear housing 15 secured to the rear of the internal combustion engine 8 of the fuel injection type. The housing members 11 and 12 are preferably of permanent mold type castings with the intermediate housing sleeve being cut from tube stock to meet the governor mounting requirements of a given engine. A centrifugal flyweight mechanism "A" is rotatably mounted in the base housing member 11 and the head 12 mounts a speeder spring and fuel control linkage "B."

Figure 2:
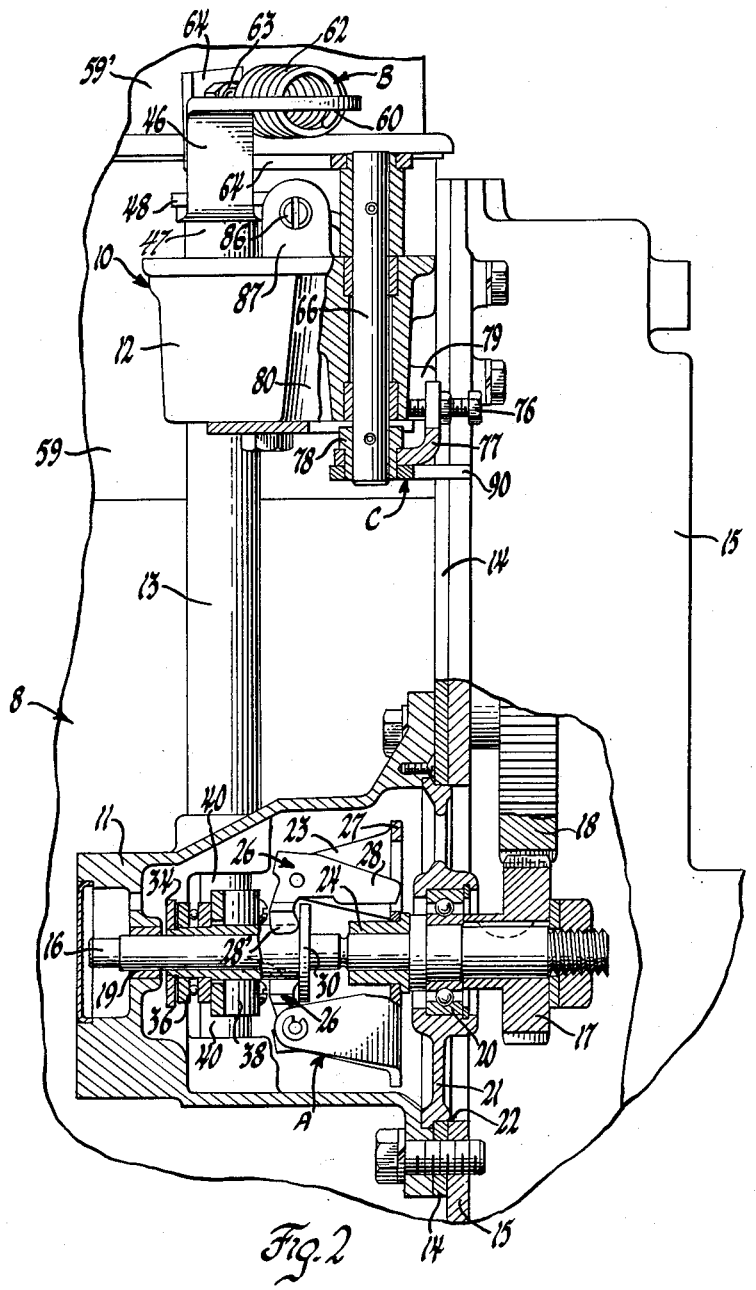
FIGURE 2 is a enlarged view similar to FIGURE 1 with portions thereof broken away and showing certain details of the governor construction in section in the plane of the line and in the direction of the arrows indicated at 2—2 in FIGURE 3.
Figure 3:
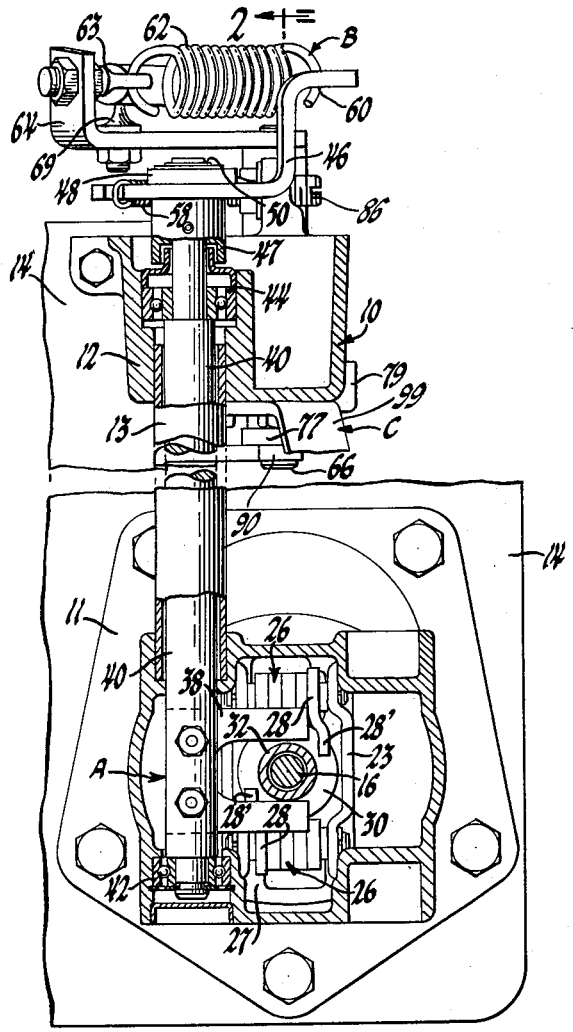
FIGURE 3 is a front elevational view showing the governor mounted on the engine with portions thereof broken away and in section substantially in the plane of the line and in the direction of the arrows indicated at 3—3 in FIGURE 1.

As best seen in FIGURES 2 and 3, the flyweight mechanism "A" comprises a shaft 16 drivingly splined or otherwise connected to a gear 17 driven by an engine crankshaft driven timing gear train partially shown at 18. The end of the shaft 16 opposite the gear 17 is journaled by a plain bearing 19 mounted in the smaller closed end of the bell housing 11. The shaft 16 is journaled adjacent its gear mounting end by a ball bearing 20 carried by a spider member 21. This spider member is supported within the larger mounting end of the bell housing 11 and telescopically pilots the flyweight mechanism and bell housing in assembly with respect to the opening 22 provided in the end plate 14. A flyweight carrier 23 is secured to the shaft 16 by a hub 24 and pivotally mounts two flyweight assemblies 26. The flyweights 26 each comprise a plurality of laminated plates which may be color-coded to indicate different materials and individual masses. These plates are selected in assembly to provide the centrifugal mass necessary for a given engine application. The carrier 23 and the several flyweight plates are preferably of stamped configuration. The speed responsive outward movement of each flyweight assembly 26 is limited by an abutment toe 27 provided on the carrier stamping 23. The carrier toes 27 abut opposite end plates 28 of the flyweight assemblies 26. These end plates are preferably made of steel and have an inwardly extending lever arm 28'. The arms 28' thrustably engage a thrust collar or washer 30 secured to the adjacent end of a riser sleeve 32 slidably mounted on the drive shaft 16. Speed responsive outward movement of the flyweights 26 is thus transferred to the riser sleeve 32 causing it to shift to the right as viewed in FIGURE 2. This motion is transmitted through a second thrust collar 34 and a bearing assembly 36 carried by the opposite end of the riser sleeve to a yoked lever member 38 which is suitably secured to the adjacent lower end of a shaft 40. This shaft provides an operative output connection intermediate the centrifugal mechanism "A" and the speeder spring and fuel control linkage "B." The shaft 40 extends between the base housing member 11 and the control head 12 within the housing tube 13 and is journaled adjacent its ends by bearings 42 and 44 carried by the base and head members, respectively.

A lever 46 having vertically offset arm portions is secured by a hub 47 to the upper end of the shaft 40 for speed responsive movement therewith. The levers 38 and 46 and the shaft 40 thus constitute the speed indicating governor output lever. A second lever 48 journaled on the upper end of the output shaft is maintained thereon by a snap ring 50. As best seen in FIGURES 4 and 5, the levers 46 and 48 form a broken-back lever having a limited lost motion driving connection therebetween formed by a lug 52 which extends upwardly from the lever 46 and normally engages the end shoulder 54 of a slot 53 formed in the shaft mounted end of the lever 48. The opposite end of the lever 48 is inclined obliquely downwardly and has a ball and socket pivotal connection at 56 to one end of a fuel control link 57. The link 57 is connectable at its opposite end to a conventional fuel injector control, not shown, mounted on the adjacent cylinder head 59 within the overhead compartment defined by the rocker cover 59'. The lever 48 is normally biased by a take-up spring 58 in a fuel increasing direction tending to maintain engagement between the slot end 54 and the lug 52. The arm of the lever 46 distal from its shaft mounting is in a plane substantially above its shaft mounting portion and is connected at 60 to one end of a tensive speeder spring 62. The opposite end of the speeder spring 62 is adjustably connected at 63 to one end of a speed adjusting lever 64. The opposite end of the lever 64 is secured to the upper end of a pivot shaft 66 journaled in and extending through the control head. For compactness, strength and economy, the several levers 38, 46, 48 and 64 are preferably fabricated from relatively inexpensive stampings and hubs formed from the stock.

The speeder spring adjusting lever 64 has an intermediate boss 68 which mounts a post 69 providing a ball-and-socket pivotal connection with a link 71 of an operator-controlled throttle linkage 70. As shown in FIGURE 1, the linkage 70 includes a friction or ratchet brake 72 which is mounted on a rockshaft 73 supported above and to the rear of the engine by a bracket 74. This brake mechanism tends to maintain operator effected adjustment of the throttle linkage and thus of the speed maintaining bias applied to the speeder spring by the operator.

As indicated above, the fuel control lever 48 is normally biased in an increasing fuel direction by the take-up spring 58 as permitted by the lug 52 of the speed responsive lever 46, the position of which is controlled by the achievement of equilibrium between the centrifugal and speeder spring forces acting on the output shaft and lever. In the drawings, the flyweights and the control linkages are shown in their idle speed maintaining equilibrium condition. As the speed adjusting lever 64 is rotated in a clockwise direction as viewed in FIGURE 4, the speeder spring bias is increased thereby increasing the engine speed setting at which equilibrium conditions are again attained. Counterclockwise rotation of the lever 64 correspondingly reduces the engine speed maintainable by the governor. Such movement of the speed adjusting lever 64 is limited between idle and full engine speed and load positions by two stop screws 75 and 76, respectively. These stop screws are threadably and spacedly mounted in an upstanding flange defining two arms of a three-arm lever 77. The third arm of the lever 77 extends laterally from the flange-defined arms and is secured by a hub 78 to the lower end of the pivot shaft 66 below the control head 12. As best seen in FIGURE 6, the stop screws 75 and 76, respectively abut arcuately recessed surfaces 79 and 80 provided on the control head and thus limit the range of speeder spring adjusting lever movement.

The lost motion connection provided between the lever arms 46 and 48 permits actuation of the fuel controlling lever 48, link 57 and of the injector controls in a fuel decreasing direction independently of centrifugal and speeder spring forces acting on the lever 46 to a fuel-off engine shutdown position. Such engine shutdown effecting movement of the fuel controlling linkages may be accomplished by any suitable operator controlled means. In the illustrative embodiment, the engine shutdown control means provided comprises a plate or tie member 81 secured to and extending from the fuel controlling link 57. One end of a flexible actuating wire 82 extends through an opening provided in the tie plate 81 and carries a thrust collar 83 which is normally spaced from the plate 81 to permit unrestricted fuel controlling movement of the link 57. The flexible wire 82 extends through a flexible sheath 84 to a suitable operating knob, not shown, associated with the engine control panel, also not shown. The governor adjacent end of the sheath 84 is supported relative thereto by a bracket assembly indicated at 85 in FIGURE 1.

Upon operator actuation of the wire 82 is a shutdown effecting direction, the thrust collar 83 engages the tie plate 81 and carries the fuel controlling link 57 and the lever 48 toward their respective fuel-off positions wherein the lever 48 engages a limit screw 86 threadably supported by a flange 87 upstanding from the control head 12. The limit screw thus prevents overtravel of the fuel controlling linkages and injector controls in a fuel-off direction. As the lever 48 approaches its shut-off position, it first engages a shut-down cushioning buffer spring 88 carried by the limit screw 86. Upon release of the shutdown control knob the fuel controlling linkages is actuated in a fuel carrying direction by the take-up and buffer springs 58 and 88 until the lever 48 assumes the fuel supply position determined by equilibrium engagement between the lug 52 and the slot defining shoulder 54 of the levers 46 and 48, respectively.

With governors of the instant variable speed control type, it is customary to provide a booster or compensating spring opposing the action of the speeder spring bias thus limiting the operator effort required to change the speed setting of the governor. In the past, such spring compensation has generally resulted in relatively complicated spring and lever arrangements or in relatively long springs extending between the speed adjusting lever and the engine frame. The instant governor makes provision for a relatively simple and compact compensating or booster spring arrangement "C" which constitutes an inexpensive and integral part of the governor assembly. As best seen in FIGURES 1 and 6, this booster spring arrangement comprises a second lever 90 secured to the hub 78 of the lever 77. The end of the lever 90 distal from the hub 78 has a reverse bend secured at 92 to one end of a tensive booster spring 94. The opposite end of the spring 94 is adjustably secured at 96 to a depending leg 98 of an L-shaped bracket 99 suitably secured to the underside of the control head 12. The lever 90, the spring 94, the adjustment 96 and the bracket leg 98 are disposed so that the biasing action or line of force of the spring 94 intersects the axis of pivot shaft 66 when the speed control and booster spring lever arms 64 and 90 are in their idle speed establishing positions. The spring 94 is thus incapable of applying a turning moment to these levers. The booster spring is shifted from its zero moment idle speed position upon rotation of the lever arms 64 and 90 in an increasing speed, counterclockwise direction as viewed in FIGURE 6. This movement of the booster spring results in a progressive increase in the moment arm of the spring with respect to the pivot shaft axis and in a reduction in the elongation of the booster spring 94. The effective biasing moment of the booster spring increases with such spring movement, however, to substantially compensate or balance the increased biasing moment of the speeder spring as the speed control lever is rotated between its idle and maximum speed establishing positions.

From the foregoing description of the preferred illustrative embodiment, it will be seen that the various objects and advantages of the invention are obtained and that various modifications might be made therein without departing from the spirit and scope thereof as defined in the following claims.

We claim:

1. A variable speed governor for an internal combustion engine comprising a housing member mountable on the engine, a speed responsive centrifugal mechanism journaled within said housing member and rotatable by the engine, a support member mountable on the engine in spaced relation to said housing member, said housing and support members having alignable openings therein, an intermediate housing tube extending between said openings, a power shaft extending through said housing tube and pivotally journaled within said openings, a first lever carried by said power shaft within said housing member and operably connected for speed responsive movement by said centrifugal mechanism, the opposite end of said shaft projecting beyond said support member and carrying a second lever for speed responsive movement therewith, a third lever pivotally mounted on said opposite shaft end in coaxial relation thereto, said third lever being operably connected to a fuel supply control means for the engine and having a limited lost motion connection with said second lever, a take-up spring means interposed between a first arm on said second lever and said third lever and biasing said third lever in an increasing fuel direction into engagement between limit stops forming the lost motion connection between said second and third levers, a pivot shaft journaled in and extending through said support member about an axis parallel to and spaced from the axis of the speed responsive power shaft, a fourth lever carried by the upper end of the pivot shaft and having an upstanding end portion swingable above said third lever, a second arm on said second lever having an offset end portion swingable above said pivot shaft, a speeder spring tensively interposed between said second and fourth lever end portions and biasing said second lever in an increasing fuel direction in opposition to the speed responsive action of said centrifugal means, and control means operably connected to adjust said fourth lever to vary the deflection of said speeder spring between idle and maximum engine speed limits and thereby the desired engine speed maintainable by said governor through equilibrium speed responsive and speeder spring positioning of said second and third levers.

2. In a variable speed engine governor as set forth in claim 1, a fifth lever secured to the end of the pivot shaft below the support member, a booster spring tensively connected between an arm on the fifth lever distal from the pivot shaft and a support bracket mounted on the underside of the support member, the spring connected arms of said fourth and fifth levers being substantially equal in radial dimension and said speeder and booster springs being of substantially equal size and characteristic, the tensive axis of the booster spring normally intersecting the axis of the pivot shaft and applying zero moment to the fifth lever when said fourth and fifth levers are in their idle speed limiting positions, movement of said fourth and fifth levers in a speeder spring bias increasing direction progressively increasing the effective moment arm of the booster spring and reducing the biasing elongation thereof to compensate for the increased biasing moment of the speeder spring acting on the fourth lever.

3. In a variable speed engine governor as set forth in claim 2, adjustable limit stops carried by said fifth lever and engageable with said support member to limit movement of said fourth lever and pivot shaft between said idle and maximum engine speeder spring biasing limits.

References Cited in the file of this patent

UNITED STATES PATENTS

| | | |
|---|---|---|
| 1,996,679 | Lepek | Apr. 2, 1935 |
| 2,047,577 | Crafts | July 14, 1936 |
| 2,250,982 | Adler | July 29, 1941 |
| 2,250,984 | Adler | July 29, 1941 |
| 2,619,075 | Holloway | Nov. 25, 1952 |
| 2,902,018 | Schlichtenmayer | Sept. 1, 1959 |